(12) United States Patent
Hill

(10) Patent No.: US 7,982,724 B2
(45) Date of Patent: Jul. 19, 2011

(54) MULTIPLE REGION VIBRATION-SENSING TOUCH SENSOR

(75) Inventor: Anthony L. Hill, River Falls, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 2019 days.

(21) Appl. No.: 10/850,516

(22) Filed: May 20, 2004

(65) Prior Publication Data

US 2005/0259378 A1 Nov. 24, 2005

(51) Int. Cl.
*G06F 3/043* (2006.01)
(52) U.S. Cl. .................................. 345/177; 178/18.04
(58) Field of Classification Search .... 178/18.01–18.04; 345/173, 177
See application file for complete search history.

(56) References Cited

U.S. PATENT DOCUMENTS

| | | | |
|---|---|---|---|
| 5,491,305 A * | 2/1996 | Kawakami et al. | 178/18.04 |
| 5,637,829 A | 6/1997 | Nakamura et al. | |
| 5,673,041 A | 9/1997 | Chatigny et al. | |
| 6,525,717 B1 | 2/2003 | Tang | |
| 7,157,649 B2 * | 1/2007 | Hill | 178/18.04 |
| 2002/0135570 A1 | 9/2002 | Iisaka et al. | |
| 2002/0155870 A1 * | 10/2002 | Romero | 463/11 |
| 2003/0063073 A1 * | 4/2003 | Geaghan et al. | 345/173 |
| 2003/0066692 A1 | 4/2003 | Devige et al. | |
| 2003/0067447 A1 * | 4/2003 | Geaghan et al. | 345/173 |
| 2005/0248548 A1 * | 11/2005 | Tsumura et al. | 345/177 |

FOREIGN PATENT DOCUMENTS

| | | |
|---|---|---|
| EP | 1 240 617 B1 | 2/2004 |
| WO | WO 98/07127 | 2/1998 |
| WO | WO 01/48684 | 7/2001 |
| WO | WO 03/005292 | 1/2003 |
| WO | WO 03/030091 | 4/2003 |

OTHER PUBLICATIONS

Robrecht, Michael et al., U.S. Application entitled "Vibration Sensing Touch Input Device", filed May 19, 2003, having U.S. Appl. No. 10/440,650.
Sullivan, Darius and Hill, Nicholas, U.S. Application entitled "Contact Sensitive Device", filed Dec. 10, 2002, having U.S. Appl. No. 10/729,540.
Hill, Nicholas, U.S. Application entitled "Piezoelectric Transducer", filed Dec. 18, 2003, having U.S. Appl. No. 10/739,471.
Hill, Nicholas and Sullivan, Darius, U.S. Application entitled "Touch Sensitive Device Employing Impulse Reconstruction", filed Dec. 31, 2003, having U.S. Appl. No. 10/750,290.
Hill, Nicholas and Sullivan, Darius, U.S. Application entitled "Touch Sensing with Touch Down and Lift Off Sensitivity" filed Dec. 31, 2003, having U.S. Appl. No. 101750,291.
Hill, Nicholas, and Sullivan, Darius, U.S. Application entitled "Touch Sensitive Device Employing Bending Wave Vibration Sensing and Excitation Transducers", filed Dec. 31, 2003, having U.S. Appl. No. 10/750,502.

* cited by examiner

*Primary Examiner* — William L Boddie
(74) *Attorney, Agent, or Firm* — Steven A. Bern

(57) ABSTRACT

The present invention provides a multiple region vibration-sensing touch sensor that incorporates at least two sets of vibration sensors on a single touch plate, each set of vibration sensors defining distinct touch regions. The vibration sensors detect vibrations indicative of a touch to the touch plate, and are configured to communicate signals representing the detected vibrations to controller electronics for determining information related to the touch input. Touches within each touch region can be distinguished.

19 Claims, 4 Drawing Sheets

MULTIPLE REGION VIBRATION-SENSING TOUCH SENSOR

This invention relates to touch sensors, and particularly to touch sensors capable of determining touch position by detecting vibrations caused or affected by a touch input.

BACKGROUND

Electronic displays are widely used in all aspects of life. Although in the past the use of electronic displays has been primarily limited to computing applications such as desktop computers and notebook computers, as processing power has become more readily available, such capability has been integrated into a wide variety of applications. For example, it is now common to see electronic displays in a wide variety of applications such as teller machines, gaming machines, automotive navigation systems, restaurant management systems, grocery store checkout lines, gas pumps, information kiosks, and hand-held data organizers to name a few.

SUMMARY OF THE INVENTION

The present invention provides a touch sensor that includes a touch plate, a first set of vibration sensors mechanically coupled to the touch plate and defining a first touch region, and a second set of vibration sensors mechanically coupled to the touch plate and defining a second touch region different from the first touch region. The vibration sensors are capable of sensing vibrations propagating in the touch plate indicative of a touch input to the touch plate, and are configured to communicate signals representing sensed vibrations to controller electronics for determining information related to the touch input.

The present invention also provides a multiple user system incorporating such a touch sensor, where the first and second touch regions are designated for touch inputs from separate users.

The present invention also provides a touch sensor system that includes one or more display devices viewable through the touch plate of the provided touch sensor.

The present invention further provides a method of making a touch sensor. The method includes providing a touch plate capable of supporting vibrations indicative of a touch input to the touch plate, mechanically coupling to the touch plate a first set of vibration sensors defining a first touch region, mechanically coupling to the touch plate a second set of vibration sensors defining a second touch region distinct from the first touch region, and electrically coupling the first and second sets of vibrations sensors to one or more controller electronics configured to determine information relating to the touch input from signals representing vibrations detected by the vibration sensors.

BRIEF DESCRIPTION OF THE DRAWINGS

The invention may be more completely understood in consideration of the following detailed description of various embodiments of the invention in connection with the accompanying drawings, in which.

Figure 1:
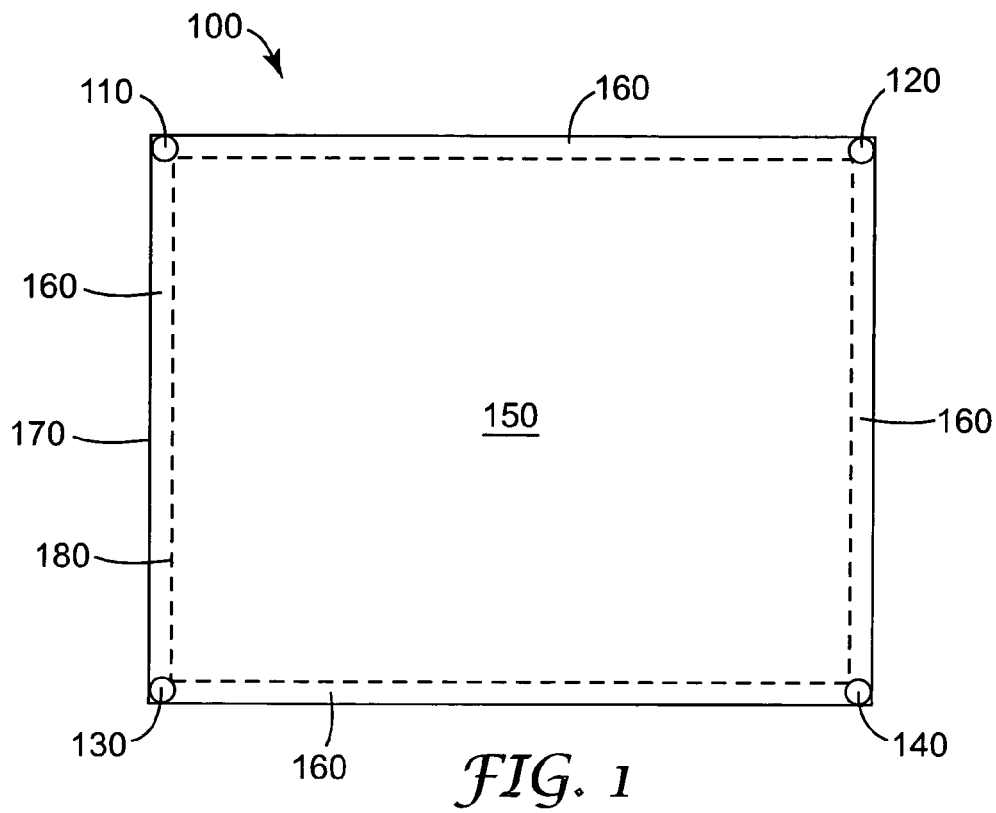
FIG. 1 is a schematic representation of a vibration-sensing touch sensor.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention relates to a vibration-sensing touch sensor device that includes at least two sets of vibration sensors, each set of vibration sensors defining distinct regions on a common touch plate intended for touch inputs. As such, the present invention provides a continuous surface on which multiple touch sensitive regions are disposed. Each touch sensitive region uses vibrations such as bending waves (also known as Lamb waves) to detect the occurrence of a user touch at least within the respective region. Signals derived from the sensed vibrations can be communicated to controller electronics that use the signals to determine information related to the touch input, such as touch location, touch force, touch implement type, and so forth. The same controller electronics can be used for all regions, or separate controller electronics can be used for each of the distinct regions. By sectioning a touch plate into distinct regions using distinct sets of vibration sensors, various advantages may be realized, including improved resolution over larger areas and the ability to distinguish and separately analyze signals derived from each distinct region.

Methods for determining touch input information from vibrations caused or altered by the touch are disclosed in International Publications WO 01/48684 and WO 03/005292, European Patent EP 1 240 617 B1, U.S. patent application Ser. No. 10/729,540, U.S. Ser. No. 10/750,290, U.S. Ser. No. 10/750,291 and U.S. Ser. No. 10/750,502, U.S. Patent Publications US 2003/0066692 and US 2002/0135570, and U.S. Pat. No. 5,637,829, all of which are incorporated into this document as if reproduced in full. Briefly, when a vibration signal due to a touch is received by the vibration sensors, time differentials for signal detection between the various pairs of vibration sensors can be used to determine the position of the touch. Phase difference information can also be used to determine touch position. Because vibrations indicative of a touch input generally include bending wave vibrations that are susceptible to dispersion during propagation, it may be desirable to correct for dispersion effects that may otherwise give rise to errors in the input position or other determined information. Exemplary methods for correcting for dispersion effects are disclosed in previously referred to document WO 01/48684. Touch force can be determined using signal amplitude information. Touch implement type can be determined by analyzing the frequencies present in the vibration signal.

Exemplary vibration-sensing touch sensors, disclosed in previous-cited document WO 01/48684, include frequency-correlated Lamb wave acoustic touch detection. A touch sensor using this type of touch detection may be made on an overlay of glass or plastic, or any other suitable material capable of supporting bending wave vibrations. The touch area of such a touch screen can be defined by placement of the vibration sensors coupled to the touch plate (typically at the corners of the overlay), and by the optional inclusion of acoustic boundaries or barriers surrounding the touch area(s). Acoustic boundaries may be the edges of the touch plate, or they may be acoustic barriers placed at the edges or elsewhere on the touch plate, for example to designate a boundary between designated touch regions.

The present invention is particularly suited to relatively large touch device applications as well as to multi-user applications that use a touch device for user input. Propagating vibrations such as bending waves over relatively long distances, for example within a relatively large touch plate, can lead to signal degradation through attenuation as well as broad frequency spreading due to signal dispersion that may be difficult to overcome without some loss in positional resolution. By dividing the touch plate into distinct regions bounded by separate sets of vibration sensors, the average propagation distance for vibrations to reach a nearest set of vibration sensors can be reduced, resulting in potentially higher positional resolution and accuracy.

In some systems of the present invention, multiple users can touch the sensor simultaneously, for example each user being dedicated to one of the distinct touch regions. The ability to distinguish between two or more users on the same touch surface is desirable in gaming and entertainment applications (e.g., two player games), as well as in applications where the form factor provided by a single continuous surface capable of distinguishing among multiple users or touch areas may be desirable for style or aesthetic reasons as compared to systems that utilize multiple separate sensor surfaces. The desire for two or more person touch screens is disclosed in International Publication WO 03/030091. Some known multi-user touch screens are limited to discriminating among users by analyzing temporal separation of signals, so that exactly simultaneous touches may be difficult to distinguish, if at all possible. Some known touch screens are also limited by a requirement that some components must be attached to the touch surface of the touch screen. Such components may include a topsheet overlay, conductive surfaces with electrodes, surface acoustic wave generators, reflectors, and detectors, and the like.

In addition to systems that allow two or more users to touch a single touch screen and display, it may be desirable to provide large-area multi-user touch screens in which a single, continuous surface provides the touch surface for all users. One example may be a multi-player table top game application that uses touch input from each of the players interacting with the table top. Another example may be a two-user game having side-by-side touch input regions, which may be implemented in any suitable format, including on large area displays. Large area touch screens may operate with one display, or there may be two or more displays operating with a single touch sensor surface that has multiple designated touch regions according to the present invention. Touch screens integrated into a table top, bar top, or display device have many applications.

Some benefits of the present invention may include, but are not limited to: the ability to realize a multi-user touch screen that can be incorporated into a glass table top; the ability to realize a flat bezel construction that has no components attached to the top (touch) surface; the ability to use seamless a glass surface as a touch plate; the ability to designate separate touch areas for each of multiple users, with the signals from each user being separable from those of other users; and the ability for each designated user area to detect multiple touches from its user separately from the other users touching within the other designated areas.

Attempts to realize distinct touch regions on a common substrate using conventional approaches and conventional touch sensor technologies may have several disadvantages. For example, the need for certain sensor elements to exist on the front surface may practically prevent the front surface from being contiguous using conventional techniques. In contrast, the present invention can be realized by placing components within a border area of the touch plate that is already designated for inclusion of such components. In exemplary embodiments, the vibration sensors are mounted on the under-side of the touch plate, that is the surface of the touch plate opposing the touch surface. Such a configuration is not possible with surface acoustic wave touch screens. Conventional approaches may also suffer from reduced manufacturing yields and/or increased field failures when a problem with one region results in the entire construction being unusable. In contrast, failure of a vibration sensor while making touch devices of the present invention can be relatively easily detected, and repair can be accomplished by simple replacement of the failed vibration sensor, which is typically an inexpensive part. In addition, some embodiments of the present invention may have built-in redundancy where closely adjacent (and non-isolated) vibration sensors, even those that help define separate sensing regions, can perform back-up duty if the other sensor is damaged or fails. Another potential difficulty with conventional technologies can be an inability to effectively isolate touch activity in one region from touch activity in another region on the same touch plate. In the present invention, any combination of acoustic damping, software or signal processing techniques, separate controller electronics, and/or vibration sensor placement and orientation can be used to help discriminate among signals generated within distinct regions.

Rather than define distinct sensor regions, another approach utilizing conventional touch technologies may be to make one large sensor subdivided into separate regions via software algorithms. Such an approach may have the disadvantage of providing lower resolution within each touch region due to the inherent accuracy of the technology being spread over the entire surface rather than being confined to each region. Such an approach also does not address the ability to differentiate simultaneous touches. The present invention addresses these issues.

FIG. 1 shows a vibration-sensing touch sensor 100 that includes a rectangular touch plate 170 and vibration sensors 110, 120, 130, and 140 located at the corners and coupled to the touch plate. When integrated into a system, for example overlaying an electronic display, the border portion 160 of touch sensor 100 may be covered by a bezel, leaving an intended touch area 150 exposed to a user. Dashed line 180 is used to indicate a separation between the border area 160 and the intended touch area 150. Dashed line 180 is an arbitrary designator, and does not necessary indicate that touches outside of its inscribed area cannot be detected. To the contrary, dashed line 180 merely inscribes an area where touch inputs are intended or expected to occur, which may include the entire touch plate or some portion or portions thereof. When dashed lines are used in this document to designate intended touch areas, they are used in this manner.

While the touch plate is shown as rectangular in FIG. 1, it can be of any arbitrary shape. The touch plate can be glass, acrylic, polycarbonate, metal, wood, or any other material cable of propagating vibrations that can be caused or altered by a touch input to the touch plate and that can be sensed by the vibration sensors. To detect the touch position in two dimensions on the touch plate, at least three vibrations sensors can be used, and are generally located at peripheral portions of the touch plate, although other locations can be used. For convenience, redundancy, or other reasons, it may be desirable to use at least four vibration sensors, for example one at each corner of a rectangular touch plate, as shown in FIG. 1. The vibration sensors can be any sensors capable of detecting vibrations in the touch plate that are caused or affected by a touch, for example bending wave vibrations.

Piezoelectric materials may provide exemplary vibrations sensors. The vibration sensors can be mechanically coupled to the touch plate by use of an adhesive, solder, or other suitable material. Conductive traces or wires (not shown) can be connected to each of the vibration sensors for communication with controller electronics (not shown). Exemplary vibration-sensing touch sensors, their operation, their components, and their layout on a sensor are disclosed in co-assigned U.S. patent application Ser. No. 10/440,650 and U.S. Ser. No. 10/739,471, which are fully incorporated into this document.

Figure 2:
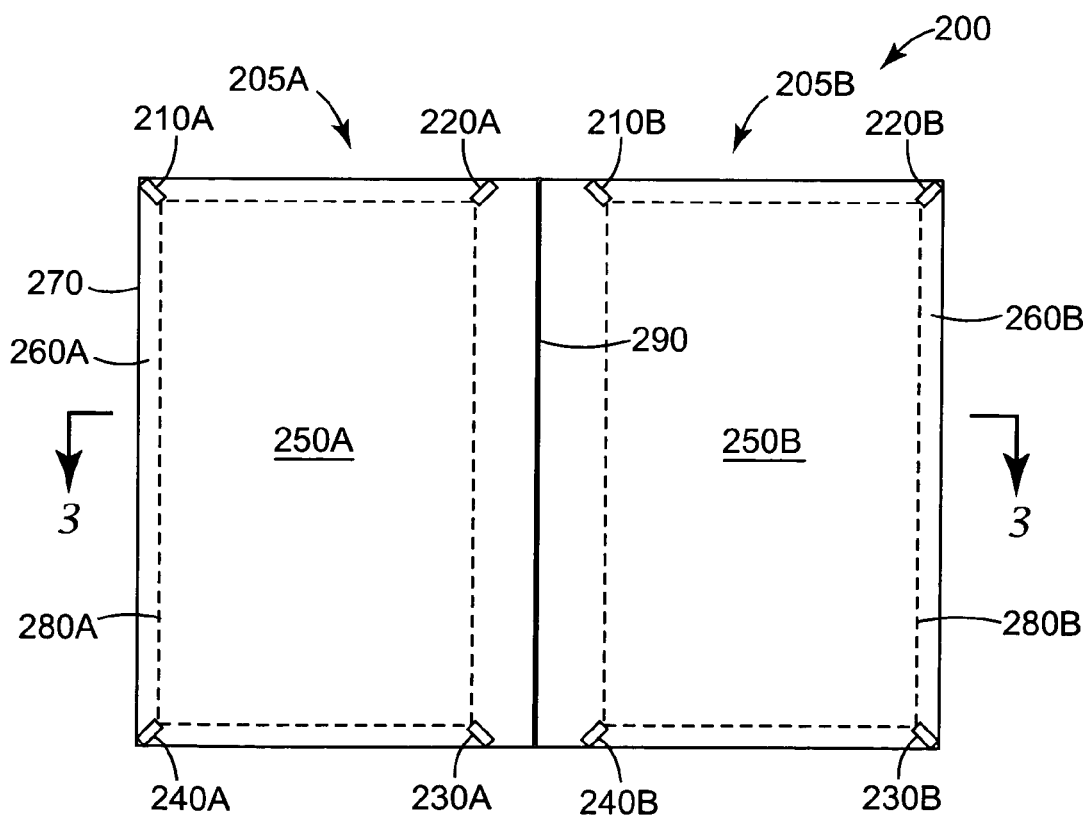
FIG. 2 is a schematic representation of a vibration-sensing touch sensor having first and second touch areas according to the present invention.

FIG. 2 shows a vibration-sensing touch sensor 200 that includes a touch plate 270 that is divided into two sections 205A and 205B. Section 205A includes a set of vibration sensors 210A, 220A, 230A, and 240A arranged at the corners of an imaginary rectangle 280A that designates an intended touch area 250A surrounded by a border area 260A. Section 205B includes a set of vibration sensors 210B, 220B, 230B, and 240B arranged at the corners of an imaginary rectangle 280B that designates an intended touch area 250B surrounded by a border area 260B. Sections 205A and 205B can be divided by an acoustic barrier 290 that can serve to absorb vibrations in the touch plate 270 so that vibrations propagating due to a touch input in one of the sections 205A and 205B can be substantially confined to that section. Barrier 290 may also serve as a strengthening beam for touch plate 270, for example in situations where the touch plate is large compared to its thickness.

The touch plate 270 can be any suitable touch plate as described previously. The touch plate can be transmissive of visible light or not depending on the application. At least some degree of transmission of visible light is desirable when a displayed image is meant to be viewed through the touch sensor. The touch plate can also incorporate static graphics (permanent or removable, laminated or otherwise attached, or held in close proximity, and positioned either above or below the touch plate), whether or not the touch sensor is used in conjunction with a display viewable through the touch plate. For example, the graphics can indicate the boundaries of the intended touch regions, can indicate that a touch on the surface immediately above some element of the graphic will invoke a specific function or operation, or the like. The touch plate can also be configured to have an image projected onto it. The touch plate can also incorporate a roughened front surface that can assist in creating detectable vibrations as a user drags a finger or other touch implement across the surface.

An acoustic barrier 290 can be used to vibrationally isolate the designated touch regions. Additionally, it may be desirable to mount the touch plate in the system so that the touch plate is substantially isolated from external vibrations and/or so that vibrations propagating in the touch plate are absorbed at the edges to reduce reflections. Acoustic barrier materials may include foam tapes or similar materials. Exemplary materials include acrylic foam tapes, double-coated adhesive tapes such as those sold by 3M Company under the trade designations 3M 4956 and 3M 5962, urethane foam tapes, single-coated tapes such as those sold by 3M Company under the trade designation 3M 4314, and the like. Other materials that may be suitable include various urethanes and silicones, as well as visco-elastic materials useful for vibration damping applications.

Figure 3A:
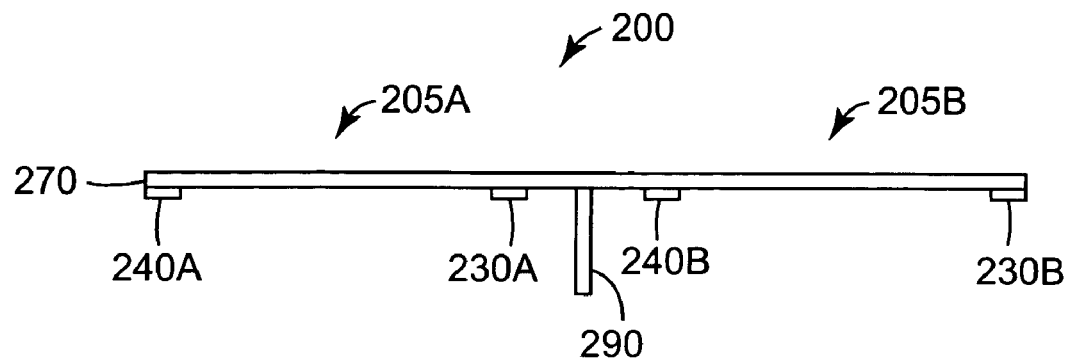
FIGS. 3(a) and (b) are schematic side views taken along line 3—3 of the touch sensor shown in FIG. 2.
Figure 3B:
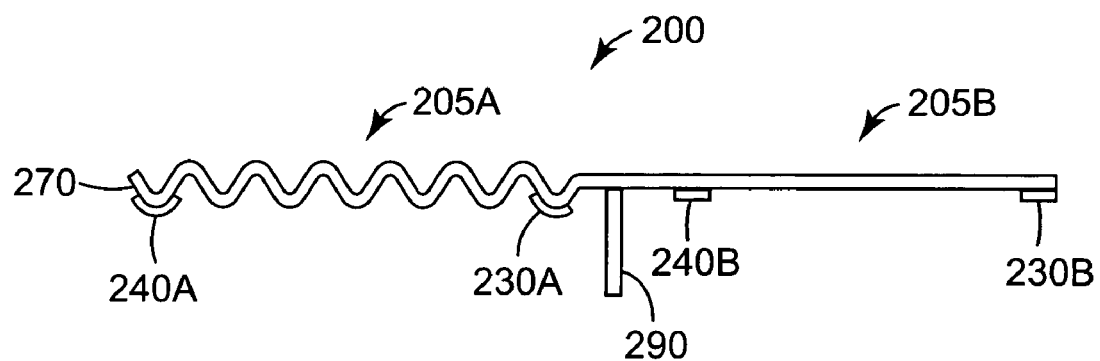

FIG. 3(a) shows a cross sectional view of touch sensor 200 taken along line 3—3 in FIG. 2. In FIG. 3(a), no vibrations are propagating in the touch plate 270. In a similar cross sectional view, FIG. 3(b) schematically shows vibrations (greatly exaggerated), such as anti-symmetric Lamb waves, propagating in section 205A of touch sensor 200, for example due to a touch input. The vibrations sensors mounted on the touch plate 270 in section 205A can measure the vibrations. As shown, barrier 290 blocks the vibrations from crossing into section 205B, so that little or no vibrational energy due to the touch input in section 205A is detected by the vibration sensors mounted on the touch plate 270 in section 205B. As such, sections 205A and 205B of touch plate 270 can propagate vibrations substantially independently, allowing independent measurement of touch inputs on each section.

Referring back to FIG. 2, the use of an acoustic barrier 290 can provide an effective physical method of separating inputs from two or more areas of a vibration-sensing touch sensor, for example those from two or more users. It is also possible to discriminate between touches on areas 250A and 250B without the use of an acoustic barrier between them. In some cases, a software correlation function can be used to determine the location of a touch for each set of vibration sensors that define areas 250A and 250B, namely 210A, 220A, 230A, and 240A for area 250A, and 210B, 220B, 230B, and 240B for area 250B, and thusly determine whether the touch energy originated in intended touch area 250A, intended touch area 250B, or in one of the border regions 260A and 260B that surround areas 250A and 250B. Thus, touch activity may be acted upon if determined to have occurred on designated portions of the touch plate and ignored if determined to have occurred on other portions of the touch plate. This approach general requires more signal processing than when relying solely on vibration isolation by using an acoustic barrier, but with a simplified sensor construction.

The vibration sensor orientation and placement can also be used to help isolate signal detection to the vibration sensors defining the touch region of interest. For example, the vibration sensors 210A through 240A and 210B through 240B are all shown to be elongated and oriented with their long axes at 45° with respect to the adjoining edges of the adjacent corner of the touch region they help define. As disclosed in previously cited document U.S. Ser. No. 10/440,650, elongated piezoelectric vibration sensors have greater sensitivity to vibrations propagating parallel to their long axes. As such, the vibration sensors defining region 250A are more sensitive to vibrations emanating from region 250A than from region 250B, particularly because vibration sensors 220A and 230A are oriented with their axes of sensitivity pointed away from region 250B. Such a feature alone or in combination with signal analysis techniques, vibration damping, or separate controller electronics dedicated to separate regions can be used to discriminate among signals due to touch inputs within different defined regions.

Figure 4:
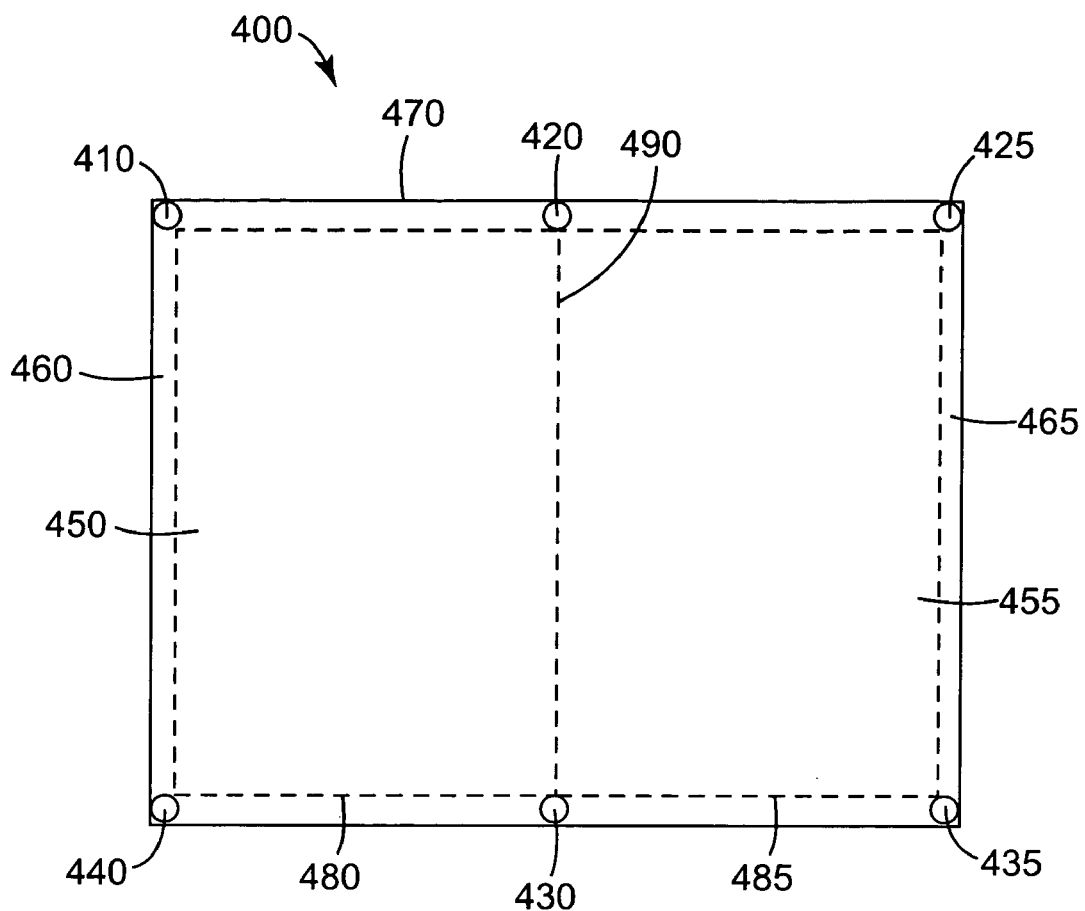
FIG. 4 is a schematic representation of a vibration-sensing touch sensor having first and second touch areas according to the present invention.

FIG. 4 shows a vibration-sensing touch sensor 400 that includes a touch plate 470 and vibration sensors 410, 420, 425, 435, 430, and 440 mounted around the periphery of the touch plate. The vibration sensors can be grouped into two sets, namely vibration sensors 410, 420, 430, and 440 that define the corners of a rectangular area 450 inscribed by dashed line 480, and vibration sensors 420, 425, 435, and 430 that define the corners of a rectangular area 455 inscribed by dashed line 485. The two areas 450 and 455 are divided by line 490. A touch input in area 450 can be detected by the set of vibration sensors 410, 420, 430, and 440. A touch input in area 455 can be detected by the set of vibration sensors 420, 425, 435, and 430. An acoustic barrier can optionally be placed along line 490 between vibration sensors 420 and 430 to provide some vibration isolation between areas 450 and 455.

Figure 5:
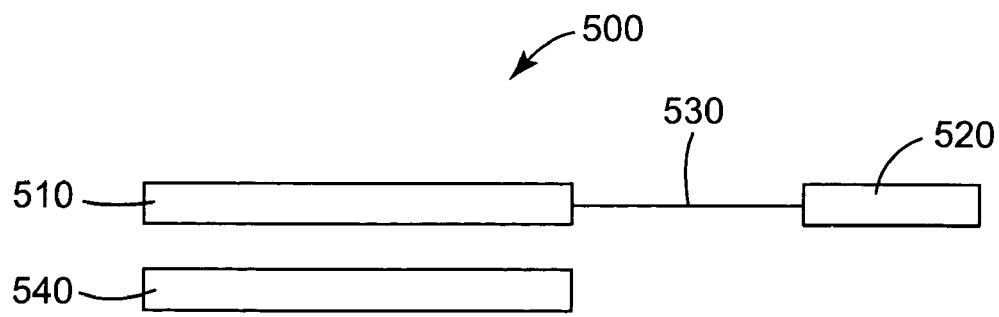
FIG. 5 is a schematic representation of a system including a vibration-sensing touch sensor.

FIG. 5 schematically shows a touch sensor system 500 that includes a vibration-sensing touch sensor 510 of the present invention and an optional display device 540 positioned for viewing through the touch sensor 510. Display device 540 may be a single display device or multiple display devices, for example one display device for each of a plurality of designated intended touch areas of the touch sensor. Touch sensor 510 is electrically coupled to controller electronics 520 through an electrical connection 530 such as a flexible cable.

Figure 6:
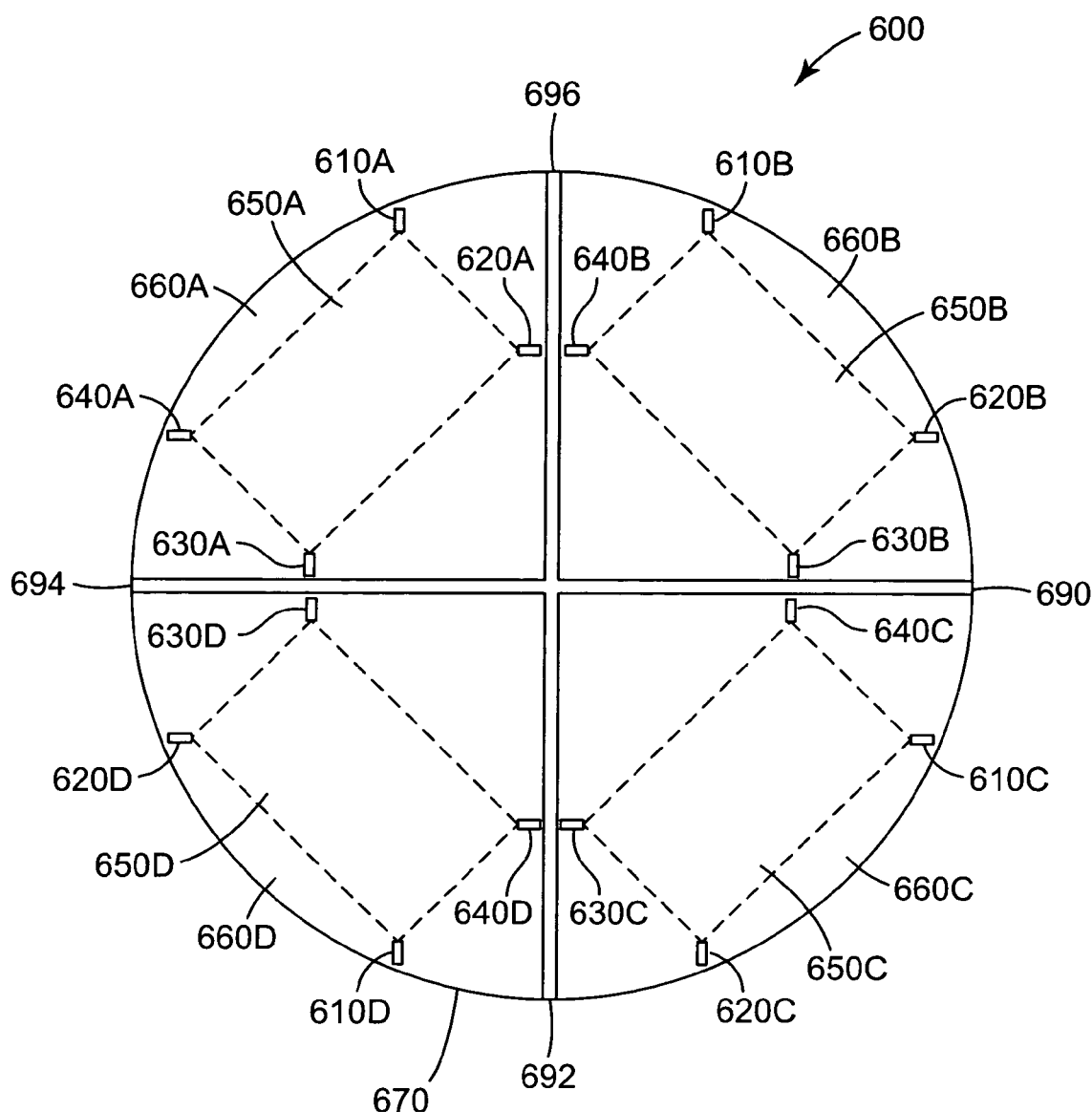
FIG. 6 is a schematic representation of one embodiment of a vibration-sensing touch sensor having multiple touch areas according to the present invention.

FIG. 6 shows an embodiment of a touch sensor 600 where a circular touch plate 670, for example a table top, is provided with four sets of vibration sensors, each set defining an intended touch area. Vibration sensors 610A, 620A, 630A and 640A can be used to designate intended touch area 650A surrounded by border area 660A. Vibration sensors 610B, 620B, 630B and 640B can be used to designate intended touch area 650B surrounded by border area 660B. Vibration sensors 610C, 620C, 630C and 640C can be used to designate intended touch area 650C surrounded by border area 660C. Vibration sensors 610D, 620D, 630D and 640D can be used to designate intended touch area 650D surrounded by border area 660D. Each of the four intended touch areas can have a display visible behind it. Acoustic barriers 690, 692, 694 and 696 can optionally be provided for vibration isolation between the designated areas as well as mechanical support for the touch plate 670, if desired.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A touch sensor, comprising:
    a touch plate;
    a first set of vibration sensors mechanically coupled to the touch plate and defining a first touch region;
    a second set of vibration sensors mechanically coupled to the touch plate and defining a second touch region different from the first touch region; and
    an acoustic damper disposed between the first touch region and the second touch region,
    wherein the vibration sensors of the first set and the second set are capable of sensing vibrations propagating in the touch plate indicative of a touch input to the touch plate and are configured to communicate signals representing sensed vibrations to controller electronics for determining information related to the touch input.

2. The touch sensor of claim 1, wherein the first set of vibration sensors are oriented for enhanced sensitivity to vibrations indicative of touch inputs within the first region as compared to vibrations indicative of touch inputs within the second region.

3. The touch sensor of claim 1, wherein the first set of vibration sensors and the second set of vibrations sensors have at least one vibration sensor in common.

4. The touch sensor of claim 1, further comprising first controller electronics configured to receive signals from the first set of vibration sensors and second controller electronics configured to receive signals from the second set of vibration sensors.

5. The touch sensor of claim 1, wherein the touch plate comprises glass.

6. The touch sensor of claim 1, wherein the touch plate comprises acrylic.

7. The touch sensor of claim 1, wherein the touch plate comprises polycarbonate.

8. The touch sensor of claim 1, wherein the touch plate is transmissive of visible light.

9. The touch sensor of claim 1, configured for viewing a displayed imaged through the touch plate.

10. The touch sensor of claim 1, configured for viewing an image projected onto the touch plate.

11. The touch sensor of claim 1, further comprising a third set of vibration sensors mechanically coupled to the touch plate and defining a third touch region different from the first and second touch regions.

12. The touch sensor of claim 1, further comprising a fourth set of vibration sensors mechanically coupled to the touch plate and defining a fourth touch region different from the first, second and third touch regions.

13. The touch sensor of claim 1, wherein the first and second touch regions are arranged to subdivide the touch plate in a manner that reduces the average propagation distance of vibrations from the touch input location to the nearest set of vibration sensors.

14. A multiple user system incorporating the touch sensor of claim 1, wherein the first and second touch regions are designated as input areas for separate users.

15. The multiple user system of claim 14, wherein the system is a multi-player game.

16. A touch sensor system comprising one or more display devices viewable through the touch sensor of claim 1.

17. The touch sensor system of claim 16, wherein a first of the one or more display devices is viewable through the first touch region and a second of the one or more display devices is viewable through the second touch region.

18. A method for making a touch sensor comprising:
    providing a touch plate capable of supporting vibrations indicative of a touch input to the touch plate;
    mechanically coupling a first set of vibration sensors to the touch plate, the first set of vibration sensors defining a first touch region;
    mechanically coupling a second set of vibration sensors to the touch plate, the second set of vibration sensors defining a second touch region distinct from the first touch region;
    arranging an acoustic damper between the first touch region and the second touch region; and
    electrically coupling the first and second sets of vibrations sensors to one or more controller electronics configured to determine information relating to the touch input from signals representing vibrations detected by the vibration sensors.

19. A touch sensor, comprising:
    a touch plate;
    a first set of bending wave vibration sensors mechanically coupled to the touch plate and defining a first touch region; and
    a second set of bending wave vibration sensors mechanically coupled to the touch plate and defining a second touch region different from the first touch region, wherein the bending wave vibration sensors of the first set and the second set are capable of sensing bending wave vibrations propagating in the touch plate indicative of a touch input to the touch plate and are configured to communicate signals representing sensed bending wave vibrations to controller electronics for determining information related to the touch input; and further comprising an acoustic damper disposed between the first touch region and the second touch region.

* * * * *